United States Patent [19]
McKee

[11] Patent Number: 5,620,731
[45] Date of Patent: Apr. 15, 1997

[54] METHOD OF PAR-BAKING A FOODSTUFF AND PRODUCT THEREOF

[75] Inventor: Phil McKee, Wichita, Kans.

[73] Assignee: TurboChef, Inc., Dallas, Tex.

[21] Appl. No.: 35,629

[22] Filed: Mar. 24, 1993

[51] Int. Cl.⁶ .............................. A21B 3/13; A21D 8/00
[52] U.S. Cl. ............................................ 426/505; 426/549
[58] Field of Search ......................... 426/549, 505

[56] References Cited

U.S. PATENT DOCUMENTS

| | | |
|---|---|---|
| 2,774,316 | 12/1956 | Daino . |
| 3,347,181 | 10/1967 | Pizzo ........................ 426/505 |
| 3,814,005 | 6/1974 | Widdel . |
| 3,949,660 | 4/1976 | Kuhlman . |
| 4,065,583 | 12/1977 | Ahlgren .................... 426/505 |
| 4,367,243 | 1/1983 | Brummett et al. . |
| 4,649,053 | 3/1987 | Lamonica . |
| 4,749,581 | 6/1988 | Gorsuch et al. ............ 426/505 |
| 4,904,492 | 2/1990 | Prigge ........................ 426/505 |
| 5,149,556 | 9/1992 | Le Viet et al. ............. 426/505 |
| 5,154,115 | 10/1992 | Kian . |
| 5,206,045 | 4/1993 | Stuck ......................... 426/243 |

*Primary Examiner*—Helen Pratt
*Attorney, Agent, or Firm*—Amster, Rothstein & Ebenstein

[57] ABSTRACT

A method of par-baking a foodstuff includes the steps of providing a raw foodstuff having a generally planar top surface, the foodstuff once par-baked being adapted for a completion of the cooking with a topping on the top surface thereof. A topping-substitute having a thermal insulation value corresponding generally to that of the topping is disposed on the top surface of the foodstuff. The foodstuff is par-baked with the topping-substitute thereon, and the topping-substitute is then removed from the par-baked foodstuff.

22 Claims, 1 Drawing Sheet

METHOD OF PAR-BAKING A FOODSTUFF AND PRODUCT THEREOF

BACKGROUND OF THE INVENTION

The present invention relates to a method of par-baking a foodstuff, and more particularly to par-baking a foodstuff so that the completely baked foodstuff is virtually indistinguishable from the foodstuff baked with topping thereon from the raw state in a single step.

Raw dough is, by definition, elastic. If raw pizza dough is placed directly on a perforated pizza cooking surface (such as a chain conveyor oven), the weight of the pizza plus any pressure from above (e.g., due to hot air impingement on the upper surface of the pizza) cause the dough to collapse and to be pulled into the perforations. As a result, when raw pizza dough is cooked in an oven with moving air, it is typically held in or on some type of pan, container, platter or other cooking vessel during the cooking process. This is the way most pizzas are cooked in traditional conveyor ovens. The pizza in a pan is placed on the conveyor at one end of the oven and when it comes out the other end of the oven, the pizza is removed from the pan. The pan is not a problem in this environment; it is standard practice.

A traditional object in cooking is to cook quality food fast. The introduction of an additional surface (e.g., a pan) between the raw dough pizza and the heat transfer means on the underside of the raw dough pizza, though enabling the pizza to be cooked and removed from a supporting surface, results in a slower cook than if the additional surface were not there. If the dough has been "pre-set"—sometimes referred to as "par-baked," "pre-baked" or "partially baked"—the pizza can be placed directly on the perforated cooking surface (without an intermediary pan) and, as a result, cook faster. This is because a par-baked pizza dough has had its dough structure set; the elasticity is gone due to setting of the dough's cell structure, and the dough has the strength to undergo the cooking process without changing shape. Using par-baked dough also speeds up the cooking process because not as much cooking is required to complete the cooking; the dough has already been partially cooked (i.e., par-baked) and merely needs to be browned and crisped during the final step of the cooking process. In fact, par-baked crusts are used frequently within the pizza restaurant industry when cooking speed is desired it may allow a reduction of from 8–8.5 minutes to 5 minutes or less in the final step cook time of a 12" diameter pizza (i.e., a reduction of about 20–30% of the total one-step cook time).

However, it is generally accepted that par-baked doughs are of lower quality than doughs that are "cooked from raw." After two step cooking, the par-baked doughs are typically tougher, drier, crustier (even in the central portion of a pizza) and frequently overcooked on the top and/or undercooked on the bottom.

On the other hand, there exists a strong impetus not to bake dough from the raw state. Baking the doughs from the raw state causes problems in practice which include the following:

1. It is extremely time consuming to prepare the dough. The dough retains its freshness for a very short period of time, typically a few hours, typically with a maximum of eight to twenty hours depending on the type of dough. As a result, dough preparation typically is done both in the morning in anticipation of the lunch business and in the afternoon in anticipation of the dinner business. A typical pizza dough-making procedure in a pizza restaurant often starts three or four hours before opening of the restaurant to the public. For example, the early arriving employees may be required to mix the dough, portion it, roll it, place it in a pan (with or without oil on the bottom), proof it (let it rise) and refrigerate it until it is time to cook it.

2. As the quality of the workforce fluctuates, and labor costs increase, there is increasing demand to remove the dough preparation phase from the pizza restaurants and have it done on a batch basis outside the restaurants in a central location.

3. Once prepared, raw dough deteriorates rapidly relative to par-baked dough, even when refrigerated, thus leading to waste when too large a quantity of raw dough has been initially prepared.

4. Typically pizza cooking ovens have only one setting at any particular time, and this causes problems when doughs of different thicknesses are cooked side by side because thinner doughs cook faster than thicker doughs.

The critical test of any solution of the "cook from raw" dough problems is that the end result must be essentially as good as freshly prepared product (i.e., the product cooked in one-step from the raw dough with topping on it).

Additionally, it is important to understand that any real solution to the raw dough problem must be adaptable to existing food products. There are several restaurant chains, each with numerous (in some cases thousands of) restaurant units. Their products are well entrenched within the restaurants' customer base, and any perceived change in the product may result in a change in consumer acceptance and, possibly, a decline in sales. For example, one of the most popular pizza styles served in many restaurant chains has a thick, soft dough which is literally fried in oil during the cook process to give it a crisp underlayer. Any solution to the "cook from raw" problems must yield finished products essentially identical to the finished products currently being served by that particular restaurant chain.

Furthermore, a solution to the raw dough problem should easily fit within the existing industry infrastructure. For example, each unit of any pizza restaurant chain is already fitted with many thousands of dollars worth of equipment. Adding more, or replacing existing, equipment is generally discouraged. Any real solution to the "cook from raw" problems should take this into account.

To summarize, the problem is that a dough cooked in two steps (i.e., a dough initially par-baked without topping on it) yields a different pizza crust than a dough cooked in one step with topping on it throughout the cooking process, the characteristics of the two-step dough pizza being less desirable than the "cooked from raw" or one-step dough pizza. In other words, how can the changes which occur during the one-step cooking process of a raw dough pizza be emulated in a par-bake environment?

Accordingly, it is an object of the present invention to provide a method of par-baking a foodstuff without topping on it so as to yield a baked dough at the end of the second (with topping) step similar to a dough baked in one-step from the raw dough with topping on it.

Another object is to provide a two-step baking method which produces a product indistinguishable from the one-step industry standard product, but which method can also fit easily into the existing industry process.

A further object is to produce a foodstuff par-baked by such a method.

SUMMARY OF THE INVENTION

It has now been found that the above and related objects of the present invention are obtained in a method of par-baking a foodstuff comprising the steps of providing a raw foodstuff having a top surface, the foodstuff once par-baked being adapted for completion of the baking with a topping on the top surface thereof. A topping-substitute having a thermal insulation value and a moisture vapor permeability corresponding generally to that of the topping is also provided. The foodstuff with the topping-substitute on the top surface thereof is par-baked, and then the topping-substitute is removed from the par-baked foodstuff.

In a preferred embodiment, the topping-substitute also has a coverage area and a weight corresponding generally to that of the topping. The topping-substitute may be a ceramic, for example, stoneware. The topping-substitute may be inedible, but is necessarily non-contaminating to the foodstuff. The topping-substitute is preferably apertured at regular intervals for passage of moisture vapor and air therethrough—e.g., foraminiferous.

In the context of a pizza baking operation, the topping-substitute preferably additionally includes a raised peripheral shoulder, thereby to form a raised rim of dough about the periphery of the pizza during the par-baking thereof, the thickness (and indeed the material) of the raised peripheral shoulder being either the same as or different than the thickness (and material) of the central portion of the topping-substitute.

Where the foodstuff is raw dough pizza of 12" diameter, it is preferably par-baked with the topping-substitute on the top surface thereof for about 2–5 minutes at 450° to 550° F., although clearly different times and temperatures may be required for other foodstuffs or pizzas of different dough types, different dough thicknesses, etc.

The present invention further encompasses a method of baking a foodstuff, comprising the steps of par-baking the foodstuff according to the method described above and then completing baking of the par-baked foodstuff with the topping on the top surface thereon. The method is preferably characterized by producing a product having the taste of the foodstuff baked in its entirety with the topping on the top surface thereon.

The present invention finally encompasses the par-baked foodstuff and the baked foodstuff with the topping on the top surface thereof, as produced by the methods described above.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein.

DETAILED DESCRIPTION OF PREFERRED EMBODIMENTS

Figure 1:
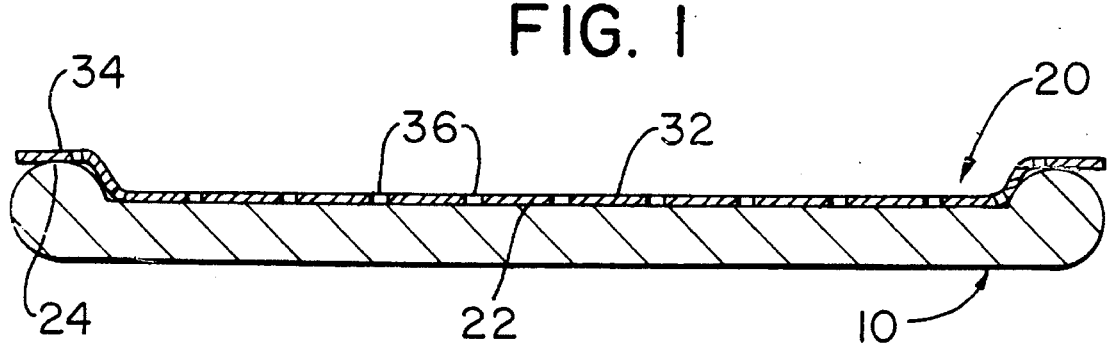
FIG. 1 is a side elevational view in section of the foodstuff being par-baked with a topping-substitute according the method of the present invention.

It has been found that the disadvantages of par-baked doughs arise as follows:

1. When a pizza dough is cooked by itself (i.e., par-baked without topping on the top thereof), more heat is driven into the top of the dough than would be the case if the dough were cooked with topping applied. This is because the topping acts as a thermal insulator for the raw dough as heat is driven into the top of the pizza. When this thermal insulator (i.e., the topping) is not present, more heat is driven into the top of the dough. This results in a tougher dough product.

2. When a pizza dough is cooked by itself, more moisture (i.e., water vapor) escapes through the top of the dough than would be the case if the dough were cooked with topping applied. This is because at least some of the topping is of low moisture vapor permeability and thereby acts as a barrier to the escape of moisture vapor driven from the top of the pizza by the cooking procedure. When the moisture vapor barrier (i.e., the topping) is not present, more moisture vapor can be driven from the top of the dough. This results in a drier dough product.

3. When a pizza dough is cooked by itself, the absence of a thermal insulating barrier (i.e., the topping) results in the formation of a very thin crust or film on the top as well as the shoulder (or rim) and sides of the pizza. This is because the dough is coming into direct contact with the heat from above. This thin crust or film creates a "mouth feel" which is foreign to the expectations of the pizza consumer, as illustrated in Table I.

TABLE I

| LAYER | PIZZA MADE WITH RAW DOUGH | PIZZA MADE WITH PAR-BAKED DOUGH |
| --- | --- | --- |
| 1 | Moist topping | Moist topping |
| 2 | Moist crust top | Tougher crust top |
| 3 | Soft crust dough | Dryer crust dough |
| 4 | Crisp lower crust | Less crisp lower crust |

The difference is similar to the difference between toasting a piece of bread and then putting jelly on it, versus toasting a piece of bread with jelly on it during the toasting process. They both have a crisp bottom, but the latter has a soft upper bite and the former has a relatively tougher, drier upper bite once the topping portion has been passed.

4. When a pizza dough is cooked by itself, the top cooks faster than the bottom because the top is exposed directly to heat while the bottom is insulated by the pan which contains the dough. As a result, if the goal is a crisp underside, often the top must be overcooked in order to achieve the desired underside. This compounds the problems defined in (1), (2) and (3) above.

5. When a pizza dough is cooked by itself, the bottom of the pizza dough is not sufficiently maintained in contact with the top surface of the pan bottom. As a result, the bottom of the par-baked pizza is typically white and undercooked (unless the top of the pizza dough is overcooked as described above). Ideally, the entire par-baked pizza bottom would be lightly browned and crisped, resulting in an even distribution of white and brown on the bottom of the par-baked pizza dough.

Thus, during the pizza "cooking from raw" process, the pizza topping acts as a thermal barrier to the top of the dough, protects the top of the dough from direct contact with the heating means, inhibits the migration of moisture through the top of the dough, and by its weight ensures adequate contact between the bottom of the dough and the pan for browning of the dough bottom. These advantages are substantially reduced or lost during the par-bake step of a conventional two-step cooking process (i.e., first a par-bake step without topping on the pizza, followed eventually by a cooking completion step with topping on the pizza).

Recognizing that in a one-step pizza-cooking operation (with the pizza "cooking from the raw" with the topping on the top of the pizza throughout), the pizza topping acts a thermal barrier to heat reaching the top of the dough, protects the top of the dough from direct contact with the heat, and inhibits the migration of moisture from the top of the dough, the present invention provides an equivalent or superior product formed in a two-step operation where the dough is par-baked with a topping-substitute thereon which emulates the topping in its essential respects.

It will be appreciated that while the topping-substitute will be generally circular in plan for a regular pizza (or rectangular for a Sicilian pizza), the configuration of the topping-substitute may vary according to the foodstuff. Where the foodstuff is characterized by a substantial thickness (such as a loaf of bread or a high cake), the topping-substitute may be designed to cover not only the top surface, but also the sidewall of the foodstuff.

It is critical that the topping-substitute have a thermal insulation value and a moisture vapor permeability corresponding generally to that of the topping. Thus, the topping-substitute takes the place of the topping during the par-baking step and acts both as a thermal barrier to the top of the dough, protecting the top of the dough from direct contact with the heat and as a moisture vapor barrier inhibiting the migration of moisture from the top of the dough.

The thermal insulation value is a measure of how well the topping-substitute or topping acts as a thermal barrier and is measured in terms of energy per unit of square area per unit of time. The higher the thermal insulation value, the less energy (calories or BTU) can pass through a given area in a given period of time. It is similar to a heat transfer coefficient (a measure of heat-insulating power in units of $BTU/(ft^2\text{-}hr\text{-}°F.\text{-}inch)$ at $0°C.$ except that it is not based on a unit thickness (as the relative thickness of the topping and topping-substitute need not be the same).

Where the moisture vapor permeability of the material of which the topping-substitute is made is lower than that of the topping, the topping-substitute may be apertured at regular intervals and, indeed, may be foraminiferous. In any case, it has been found that providing the topping-substitute with a pattern of apertures for passage of moisture vapor therethrough also provides the additional advantage of allowing air to escape from under the pizza during the par-baking step so that there is less flapping or movement of the topping-substitute than where the topping-substitute is relatively air impermeable. Accordingly, regardless of the moisture vapor permeability of the topping-substitute, it is desirable that the topping-substitute be provided with a pattern of apertures therethrough or be foraminiferous to enable the passage of air therethrough when movement of the topping-substitute is a problem. Determination of the water vapor permeability of the topping-substitute must take into account any apertures extending therethrough since water vapor can pass not only through the material itself (where the material has some water vapor permeability), but also through the apertures extending therethrough.

The topping-substitute preferably also has a minimum coverage area corresponding generally to the topping so that the portion of the top surface of the foodstuff which is eventually covered by the topping during the final baking step is covered by the topping-substitute during the par-baking step. Typically, the topping covers all but a peripheral rim about a pizza, the rim typically being less than an inch in width, but varying with the size of the pizza. It will be appreciated that such a coverage area of the topping-substitute cooperates with the thermal insulation value and moisture vapor permeability of the topping-substitute to provide better emulation of the topping by the topping-substitute.

The topping-substitute preferably also has a minimum weight corresponding generally to that of the topping so that it retards the rising of the dough thereunder during the par-baking step to the same degree as would the weight of the topping during the early phase of the "cooking from raw" operation. In the context of a pizza foodstuff, the weight limits the rising of the dough thereunder to form a large, central depression within the peripheral rim. Furthermore, the weight of the topping-substitute on the top surface of the dough ensures that the bottom of the dough will be in sufficient contact with the pan to provide a desired level of browning to the dough bottom.

Of course, it is absolutely essential that the topping-substitute be non-contaminating to the foodstuff so that the foodstuff is not rendered inedible by the par-baking step. This does not mean that the topping-substitute must be edible, only that, if it is non-edible, no noxious portion of it will transfer to the foodstuff.

Optionally, in the context of a pizza foodstuff, the periphery of the topping-substitute about the large central portion thereof may define an elevated shoulder of sufficient width to overlap the rim of the pizza dough. This configuration may produce a superior product to the industry standard pizza because the rim or shoulder of the pizza, which rim is often overcooked and overbrowned during the one-step "cooking from raw" operation because there is no topping thereon at any time, is protected by the elevated shoulder of the topping-substitute during the par-baking step so that the rim does not overcook, dry out or form a film as much during the par-baking step. The shoulder of the topping-substitute may be thinner or thicker than the central portion of the topping-substitute, as desired, in order to provide an optimum pizza which is even superior to that obtained during the conventional one-step baking operation. (Typically the shoulder will be thinner or elevated above the pizza rim in order to provide adequate cooking of the relatively thick pizza rim.) In fact, the topping-substitute may be a composite of one material for the central portion and another material for the shoulder.

The minimum coverage area and the minimum weight of the topping-substitute corresponding generally to that of the topping is determined based on the large central portion of the topping-substitute without including any shoulder thereof.

The topping-substitute may be formed of any of a variety of materials meeting the aforementioned criteria. A preferred topping-substitute is a ceramic, such as a non-toxic semi-vitreous kiln-fired kaolin-type clay containing about 4% silica (available under the trade name "Stoneware" from Grieco Ceramics Co. of Fort Worth, Tex. 76105). However, other ceramic and non-ceramic materials may alternatively be employed—for example, laminated organic materials (such as wood or cardboard), cement, glass, thermoset plastics, etc. The determination of whether or not a given material is suitable as a topping-substitute once the initial non-contaminating property has been established is a matter of routine experimentation, keeping in mind primarily the thermal insulation value and moisture vapor permeability requirements and secondarily the weight and coverage considerations. Two pieces of metal (e.g., aluminum) vertically spaced apart by spacers to provide a 0.5" gap of air insulation may suffice.

While it is recognized that there are many different types of topping used on pizza dough, the various types of topping invariably contain relatively large quantities of tomato sauce and cheese, these typically constituting at least 50%, and often 75% by weight, of the total topping. While the optional additives to the basic tomato sauce/cheese topping combination may vary, the overall difference in thermal insulation provided by most types of topping is expected to fall within a range of plus or minus 40% of the thermal insulation provided by an average or mean topping. Accordingly, if the topping-substitute is designed to emulate the mean topping, it will serve well for most specific types of topping.

Interestingly, it has been found that during the par-baking step of oil fried doughs requires less oil in the pan than during the normal one-step "cooking from raw" operation, and, regardless of the amount of oil used, less oil is absorbed by the dough. This results in a healthier pizza having less cholesterol to gain the same bottom crust crispiness since less oil has been absorbed.

Referring now to the drawing, and in particular to FIG. 1 thereof, therein illustrated is an elevational view of a foodstuff 10 in the form of a raw dough pizza being par-baked with a topping-substitute 20 on the top surface 22 thereof according to the present invention. The method involves the steps of providing a raw foodstuff 10 having a top surface 22, the top surface 22 preferably being generally planar and optionally surrounded by a raised rim 24 (as is customary in some pizza). As the foodstuff 10 is intended to be par-baked and then have the cooking completed with a topping 30 (see FIG. 3) on the top surface 22 thereof, it is also necessary to provide a topping-substitute 20 as described hereinabove. The topping-substitute 20 has a generally disk-like or cylindrical central portion 32 adapted to sit on the central top surface 22 of the pizza and optionally a raised, outwardly-extending shoulder 34 adapted to sit on the raised rim 24 of the pizza (or thereabove to allow rising of the dough to form the rim 24 during par-baking). Typically, the topping-substitute 20 will have a plurality of small apertures 36 therethrough. Where the foodstuff is raw dough for pan pizza (specifically 12" diameter, 0.75" high, weighing about 1 pound), it is preferably par-baked with the topping-substitute on the top surface thereof for about 2–5 minutes in a conveyor oven at 450° to 550° F. (optimally 4.0 minutes at 490° F.), although other times and temperatures may be optimal for par-baking other foodstuffs having different dough types, dough thicknesses, dough weights, etc.

Figure 2:
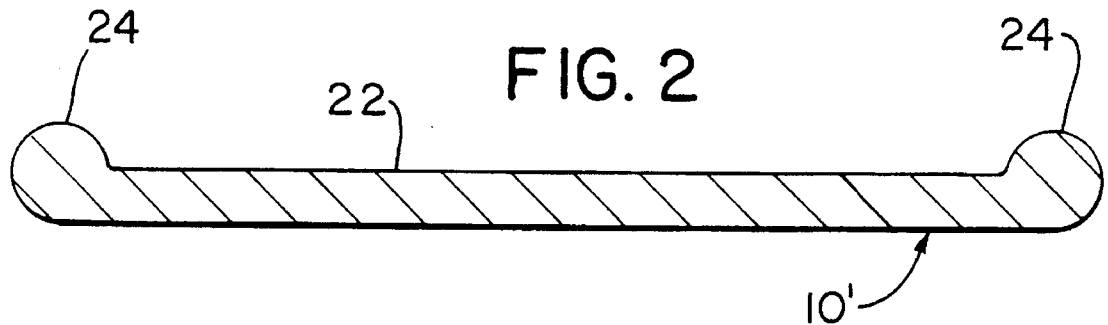
FIG. 2 is a side elevational view in section of the par-baked foodstuff according to the present invention after removal of the topping-substitute therefrom.

Referring now to FIG. 2, therein illustrated is the par-baked foodstuff 10' after removal of the topping-substitute 20 therefrom.

Figure 3:
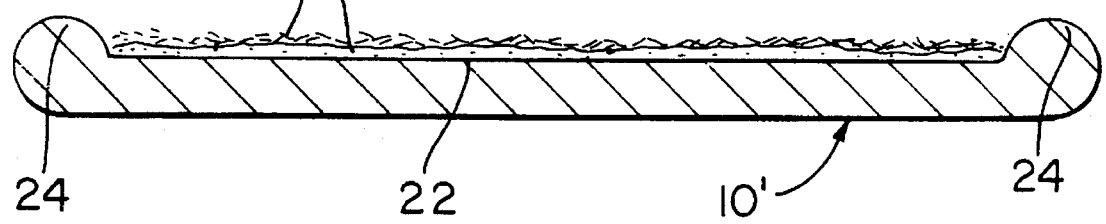
FIG. 3 is a side elevational view in section of the par-baked foodstuff with a topping thereon undergoing completion of the baking.

Referring now to FIG. 3, therein illustrated is the par-baked pizza 10' with topping 30 thereon undergoing conventional completion of the baking process.

It will be appreciated that the par-baked foodstuff 10' may be kept refrigerated or frozen prior to completing the baking thereof. The topping 30 may be added to the top surface 22 of the par-baked pizza 10' prior to refrigeration and/or freezing or just prior to the step of completing the baking, depending upon the type of topping, the intended storage time and the like.

It will be appreciated that present invention avoids the problems associated with baking dough from the raw state and lends itself to the existing industry process (including the desire to have dough preparation done on a batch basis in a central location outside the restaurant), while avoiding the problems associated with conventional par-baked dough. Most importantly, pizza prepared according to the present invention meets the critical test in that the end result is as good as freshly prepared product (i.e., product cooked in one step from the raw dough with topping on it) and in particular instances even better.

It will be appreciated by those skilled in the art that the par-baking step reduces the time required for the final cook step, as that final cook step does not have to cook the dough from the raw state. On the other hand, the final cook step must be of sufficient length to ensure that the topping is adequately cooked and in particular that the cheese is thoroughly melted. The latter time is typically greater than the former; thus, the final cook step time according to the present invention is determined by the type and quantity of topping more than by the need to complete baking of the par-baked dough.

Informal taste tests comparing pizzas cooked according to the present invention in a two-step operation and pizzas cooked from raw in a one-step operation have consistently found that the two-step product according to the present invention is comparable to (and in some instances better than) the conventional "cook from raw" one-step product. Because the dough cooked according to the present invention has in all phases of the cooking procedure either a topping or a topping-substitute thereon, the dough is moister, less dry and more evenly cooked (i.e., the top is not overcooked relative to the bottom) relative to the comparable product, cooked in a conventional two-step operation. Additionally, the dough cooked according to the present invention is similar to one-step cooked dough as there is no thin crust or film formed on the top surface of the central depression of the pizza since the topping or topping-substitute prevents the dough from coming into direct contact with the overhead heat.

To summarize, the present invention provides a method of par-baking a foodstuff without topping on it so as to yield, after baking is completed with topping on the par-baked foodstuff, a baked product similar to a product baked in one step from the raw dough with topping on it. The method produces products indistinguishable from the industry's standard products and can fit easily into the existing industry process.

Now that the preferred embodiments of the present invention has been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A method of par-baking a foodstuff intended to be subsequently cooked with an edible topping having a given thermal insulation value and a given moisture vapor permeability on the top surface thereof, comprising the steps of:

(A) providing a raw foodstuff having a top surface, the foodstuff once par-baked being adapted for completion of the baking with a topping on the top surface thereof;

(B) placing on the top surface of the raw foodstuff a topping-substitute having a thermal insulation value and moisture vapor permeability corresponding generally those of the topping;

(C) par-baking the foodstuff with the topping-substitute on the top surface thereof as both a thermal barrier and a moisture vapor barrier, thereby to decrease the rate of heat transfer to the foodstuff top surface and the rate of moisture vapor transfer from the foodstuff top surface during par-baking relative to par-baking without the topping-substitute; and (D) removing the topping-substitute from the par-baked foodstuff;

whereby upon completion of the subsequent cooking of the foodstuff with the topping thereon, the foodstuff simulates a foodstuff baked entirely with the topping thereon.

2. The method of claim 1 wherein the topping-substitute additionally includes a raised peripheral shoulder, thereby to form a raised rim about the periphery of the foodstuff during par-baking thereof.

3. The method of claim 1 wherein the topping-substitute has a coverage area corresponding generally to that of the topping.

4. The method of claim 1 wherein the topping-substitute has a weight corresponding generally to that of the topping.

5. The method of claim 1 wherein the topping-substitute has a coverage area and a weight corresponding generally to that of the topping.

6. The method of claim 1 wherein the topping-substitute is a ceramic.

7. The method of claim 1 wherein the ceramic is stoneware.

8. The method of claim 1 wherein the topping-substitute is inedible.

9. The method of claim 1 wherein the topping-substitute is non-contaminating to the foodstuff.

10. The method of claim 1 wherein the topping-substitute is apertured at regular intervals for passage of air therethrough.

11. The method of claim 1 wherein the topping-substitute is foraminiferous.

12. The method of claim 1 wherein the foodstuff is raw dough and is par-baked with the topping-substitute on the top surface thereof for 2–5 minutes at 450° to 550° F.

13. The par-baked foodstuff produced according to the method of claim 1.

14. A method of baking a foodstuff, comprising the steps of:
(A) par-baking the foodstuff according to the method of claim 1; and
(B) completing baking of the par-baked foodstuff with the topping on the top surface thereon.

15. The method of claim 14 characterized by producing a product having the taste of the foodstuff baked in its entirety with the topping on the top surface thereon.

16. The baked foodstuff with the topping on the top surface thereof made according to the method of claim 14.

17. A method of par-baking a foodstuff intended to be subsequently cooked with an edible topping having a given thermal insulation value and a given moisture vapor permeability on the top surface thereof, comprising the steps of:
(A) providing a raw foodstuff having a top surface, the foodstuff once par-baked being adapted for completion of the baking with a topping on the top surface thereof
(B) placing on the top surface of the raw foodstuff a topping-substitute which is inedible but non-contaminating to the foodstuff and has a thermal insulation value, a moisture vapor permeability, a coverage area and a weight corresponding generally to those of the topping;
(C) par-baking the foodstuff with the topping-substitute on the top surface thereof as both a thermal barrier and moisture vapor barrier, thereby to decrease the rate of heat transfer to the foodstuff top surface and the rate of moisture vapor transfer from the foodstuff top surface during par-baking relative to par-baking without the topping-substitute; and
(D) removing the topping substitute from the par-baked foodstuff;
whereby, upon completion of the subsequent cooking of the foodstuff with the topping thereon, the foodstuff simulates a foodstuff baked entirely with the topping thereon.

18. The method of claim 17 wherein the foodstuff is raw dough and is par-baked with the topping-substitute on the top surface thereof for 2–5 minutes at 450° to 550° F.

19. The par-baked foodstuff produced according to the method of claim 17.

20. A method of baking a foodstuff, comprising the steps of:
(A) par-baking the foodstuff according to the method of claim 17; and
(B) completing baking of the par-baked foodstuff with the topping on the top surface thereon;
said method of baking being characterized by producing a product having the taste of the foodstuff baked in its entirety with the topping on the top surface thereon.

21. The baked foodstuff with the topping on the top surface thereof made according to the method of claim 20.

22. A method of par-baking a pizza intended to be subsequently cooked with an edible topping having a given thermal insulation value and a given moisture vapor permeability on the top surface thereof, comprising the steps of:
(A) providing a raw pizza having a top surface, the pizza once par-baked being adapted for completion of the baking with a topping on the top surface thereof;
(B) placing on the top surface of the raw foodstuff a topping-substitute having a thermal insulation value and moisture vapor permeability corresponding generally to those of the topping;
(C) par-baking the pizza with the topping-substitute on the top surface thereof as both a thermal barrier and a moisture vapor barrier, thereby to decrease the rate of heat transfer to the foodstuff top surface and the rate of moisture vapor transfer from the foodstuff top surface during par-baking relative to par-baking without the topping-substitute; and
(D) removing the topping-substitute from the par-baked pizza
whereby, upon completion of the subsequent cooking of the pizza with the topping thereon, the pizza simulates a pizza baked entirely with the topping thereon.

* * * * *